United States Patent [19]
Ahmed et al.

[11] Patent Number: 6,033,302
[45] Date of Patent: Mar. 7, 2000

[54] ROOM PRESSURE CONTROL APPARATUS HAVING FEEDFORWARD AND FEEDBACK CONTROL AND METHOD

[75] Inventors: Osman Ahmed, Buffalo Grove, Ill.; John W. Mitchell; Sanford A. Klein, both of Madison, Wis.

[73] Assignee: Siemens Building Technologies, Inc., Buffalo Grove, Ill.

[21] Appl. No.: 08/965,982

[22] Filed: Nov. 7, 1997

[51] Int. Cl.[7] .................................................. F24F 11/04
[52] U.S. Cl. ............................................ 454/238; 454/61
[58] Field of Search .............................. 454/56, 61, 238, 454/255, 340

[56] References Cited

U.S. PATENT DOCUMENTS

| | | |
|---|---|---|
| 4,485,729 | 12/1984 | Crittenden et al. ...................... 454/238 |
| 5,090,303 | 2/1992 | Ahmed ................................ 454/238 X |
| 5,092,227 | 3/1992 | Ahmed et al. . | 
| 5,304,093 | 4/1994 | Sharp et al. ............................... 454/61 |
| 5,385,505 | 1/1995 | Sharp et al. ............................. 454/238 |
| 5,573,181 | 11/1996 | Ahmed . |
| 5,720,658 | 2/1998 | Belusa ..................................... 454/238 |
| 5,764,579 | 6/1998 | McMasters et al. .................. 454/61 X |
| 5,810,657 | 9/1998 | Pariseau ................................... 454/61 |

OTHER PUBLICATIONS

B. Argüello–Serrano and M. Vélez–Reyes, "Design of a Nonlinear HVAC Control System with Thermal Load Estimation", *IEEE*, pp. 33–39, 1995.

W.K. Gawronski, C.S. Racho, J.A. Mellstrom, "Application of the LQG and Feedforward Controllers to the Deep Space Network Antennas", *IEEE Transactions on Control Systems Technology*, pp. 417–421, vol. 3, No. 4, Dec. 1995.

M. Soroush, "Discrete–Time Feedforward/Feedback Control of Multivariable Nonlinear Processes", *Proceedings of the American Control Conference*, Baltimore, Maryland, pp. 1349–1353, Jun. 1994.

J. Bentsman, N. Miller, D. Drake, J. Fakhfakh, T. Jolly, G. Pellegrinetti, J. Tse, "Control of Steam Generation Processes", *ACC*, San Diego, pp. 1206–1207, May 23–25, 1990.

S.A. Norman, S.P. Boyd, "Multivariable Feedback Control of Semiconductor Wafer Temperature", *ACC*, pp. 811–816, 1992.

D.F. Specht, "Probabalistic Neural Networks for Classification, Mapping, or Associative Memory", pp. I–525–I–532.

L.G. Kraft, D.P. Campagna, "A Comparison Between CMAC Neural Network Control and Two Traditional Adaptive Control Systems", *IEEE Control Systems Magazine*, pp. 36–43, Apr. 1990.

D. Psaltis, A. Sideris, A.A. Yamamura, "A Multilayered Neural Network Controller", *IEEE Control Systems Magazine*, pp. 17–21, Apr. 1988.

T.G. Buchman, K.L. Kubos, A.J. Seidler, M.J. Siegforth, "A Comparison of Statistical and Connectionist Models for the Prediction of Chronicity in a Surgical Intensive Care Unit", *Critical Care Medicine*, pp. 750–762, vol. 22, No. 5, May 1994.

P.J. Grother, G.T. Candela, "Comparison of Handprinted Digit Classifiers", U.S. Dept. of Commerce, Jun. 1993.

D.F. Specht, "A General Regression Neural Network", *IEEE Transactions on Neural Networks*, pp. 568–576, vol. 2, No. 6, Nov. 1991.

*Primary Examiner*—Harold Joyce
*Attorney, Agent, or Firm*—Greer, Burns & Crain, Ltd.

[57] ABSTRACT

A controller for heating, ventilating and air-conditioning distribution systems, which includes a feedforward and feedback control strategies. The controller has a feedforward control strategy that generates a control signal based on control set points and identified characteristics of the system, and which adaptively adjusts such set points based on changes that are measured with respect to the identified characteristics. The controller is particularly adapted for controlling the differential air pressure in a controlled space relative to adjacent spaces.

9 Claims, 10 Drawing Sheets

PREDICTED LOAD USING VARIOUS TECHNIQUES

ROOM PRESSURE CONTROL APPARATUS HAVING FEEDFORWARD AND FEEDBACK CONTROL AND METHOD

CROSS REFERENCE TO RELATED APPLICATIONS

Temperature Control Apparatus Having Feedforward and Feedback Control and Method, filed Nov. 7, 1997, Ser. No. 08/965,961, by Osman Ahmed, John W. Mitchell and Sanford A. Klein.

FIELD OF THE INVENTION

The present invention generally relates to control systems, and more particularly to control systems that are used in heating, ventilating and air conditioning fluid distribution systems.

BACKGROUND OF THE INVENTION

Fluid distribution systems associated with heating, ventilating and air-conditioning (HVAC) distribution systems are well known in the art, and are widely used in commercial applications, including apartment buildings and office buildings, for example. Such systems also see widespread use in laboratory-type settings, and in such an implementation, the HVAC system must not only control the temperature of the air in the building, but must also exhaust potentially noxious fumes, particularly if the building has a number of laboratory fume hoods in which experimental work is being carried out. Another implementation that has additional important considerations in addition to controlling the temperature of the air in the building involves clean room environments where manufacturing of electronic integrated circuits and the like is carried out.

In both of these latter implementations, the pressure of a room of interest may have to be controlled to be different from the space or rooms adjacent to the room of interest. In the case of the clean room environment, the room of interest must be maintained at a differential pressure higher than the surrounding space to insure that contaminates do not enter the room. In the case of the laboratory environment, the room of interest is kept at a differential pressure less than the surrounding area to contain any noxious fumes in the room.

To maintain a room of interest at a desired differential pressure relative to the surrounding area, the HVAC system must be capable of controlling the flow of air into the room, and the flow of air being exhausted from the room, and must take into consideration any other air flow into and out of the room. Given the temperature control requirements that must be maintained in the room, it becomes a more complicated control problem that is not easily solved.

While variable air volume (VAV) control equipment has been used for providing a control strategy for the implementations discussed above, and such control equipment has utilized a combination of feedforward and feedback control methodology, there continues to be a need for an effective control apparatus that provides improved performance, ease of implementation and cost effectiveness.

SUMMARY OF THE INVENTION

It is therefore a primary object of the present invention to provide an improved room pressure control apparatus having feedforward and feedback control strategies and a method of controlling such apparatus.

Another object is to provide such an improved controller which provides superior performance, notable ease of implementation and significant cost effectiveness.

A related object is to provide such an improved controller which includes a feedforward control strategy that generates a control signal based on control set points and identified characteristics of the system, and which adaptively adjusts such set points based on changes that are measured with respect to the identified characteristics.

Still another object is to provide such an improved controller in which the feedforward control strategy uniquely employs the physical laws of conservation of energy and mass to determine control set points that are employed in the feedforward control strategy.

Yet another object is to provide such an improved controller which utilizes a general regression neural network (GRNN) to identify the characteristics of the system, which results in simple, robust and excellent capability in system identification, with minimal computational time.

Another object is to provide an improved control system which includes such a feedforward process as well as a feedback process to generate a control signal, with the combination of such processes providing superior performance in many respects.

These and other objects will become apparent upon reading the following detailed description of the preferred embodiment of the present invention, while referring to the attached drawings.

DETAILED DESCRIPTION OF A PREFERRED EMBODIMENT

Broadly stated, the present invention is directed to a controller and method of determining a control signal that uses a combined feedforward and feedback control method for HVAC systems generally, and particularly for laboratory rooms. Although a laboratory room implementation will be specifically described herein, the proposed control topology and results are valid for cleanroom applications where pressure is kept higher than the adjacent space to prevent any contaminants to flow into the room of interest from the outside.

Figure 1A:
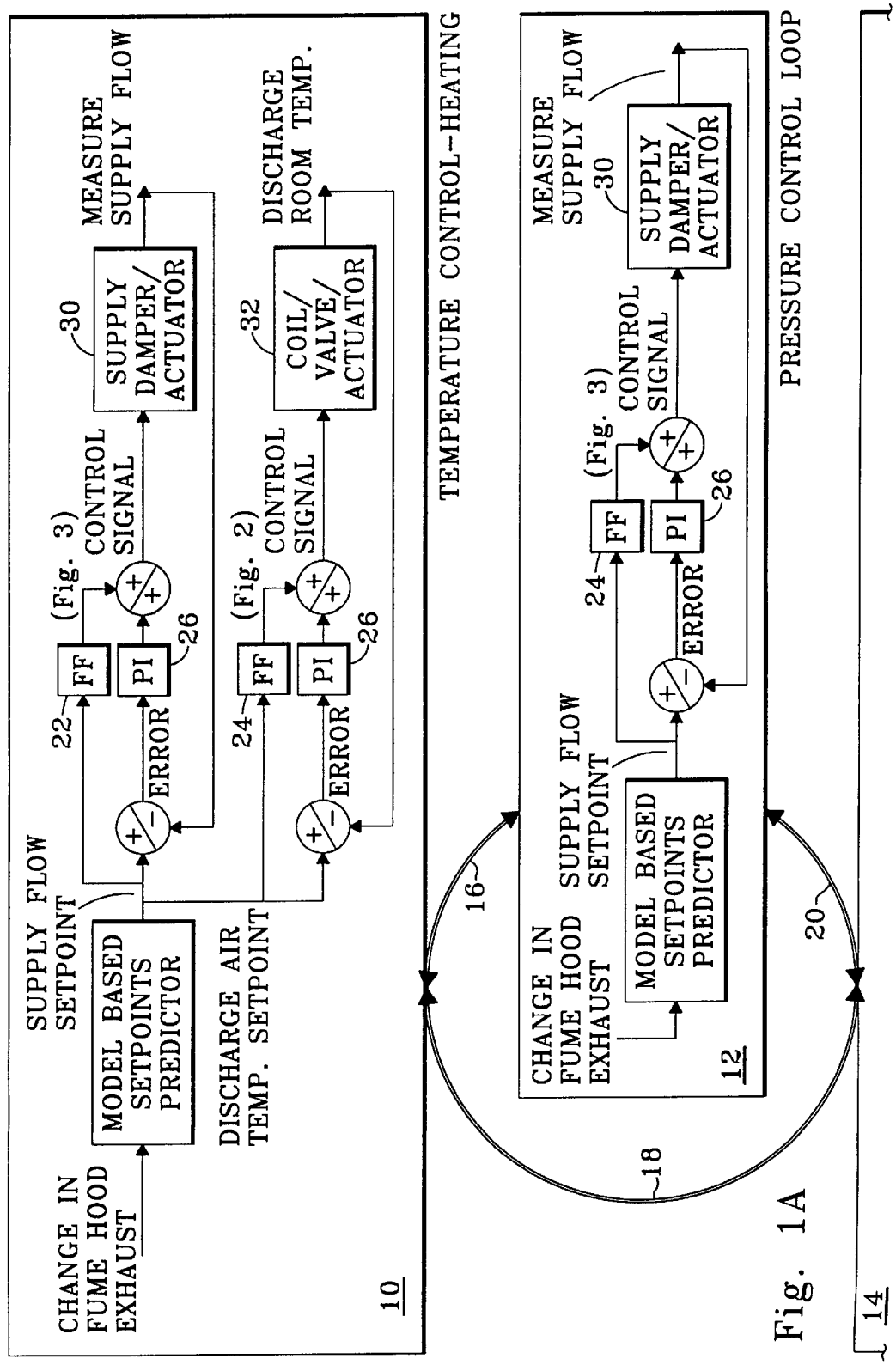
FIG. 1 generally depicts, in block diagram form, a controller embodying the present invention and also related control functionality.
Figures 1, 1B:
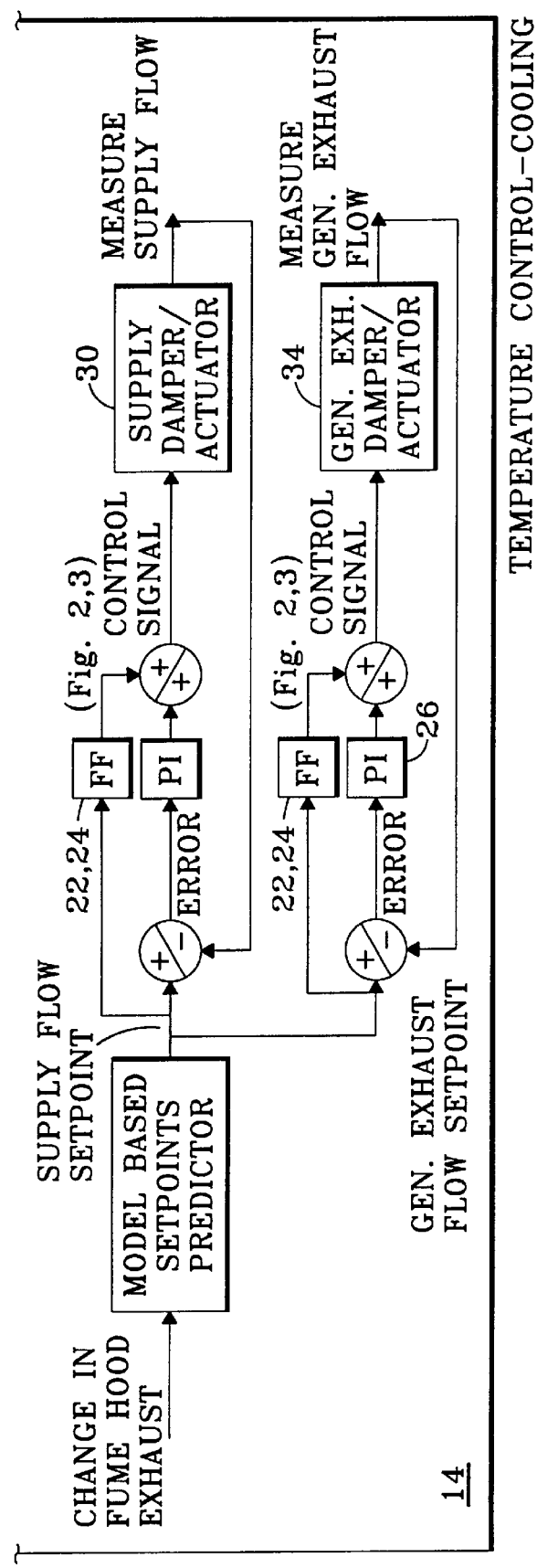

The controller utilizes a combination of feedforward and feedback control as shown in the block diagram of FIG. 1, which includes three distinct control loops, namely: a temperature control loop for heating, identified generally at 10; a pressure control loop embodying the present invention, indicated generally at 12; and a temperature control loop for cooling, indicated generally at 14. The three loops are functionally interconnected as shown by lines 16, 18 and 20, and all loops are preferably implemented in a processing means, not shown, such as a microprocessor or the like.

With regard to the pressure control loop 12 embodying the present invention, room pressure is typically controlled in terms of a differential instead of an absolute value. The differential is defined as a difference between a reference space, i.e., an adjacent corridor and the room itself. For a laboratory room application, the goal is to keep the differential pressure positive within a range of about 0.005 to 0.05 w.c. This assures that the room pressure remains lower than the adjacent pressure under all operating conditions, and prevents air from leaking into adjacent spaces. For a clean room application, the pressure in the room is maintained at a higher differential pressure than adjacent space to prevent leakage into the room.

There are three common methods of room pressure control in use today, including direct pressure, flow tracking and cascaded control. Each of these schemes essentially modulates the supply flow in order to maintain the room differential pressure. Hence, a simple sequence is considered to assess the performance of different control methods for pressure control. For a laboratory control application having fume hoods in the room, a step change in the fume hood exhaust requires modulation of the supply air flow to maintain the differential pressure set point.

Figure 12:
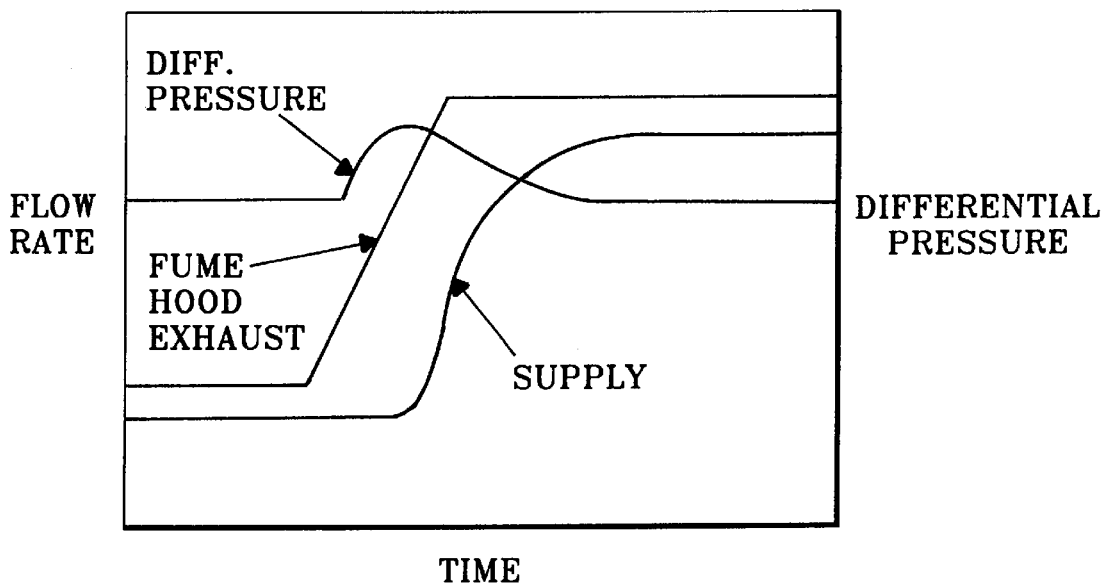
FIG. 12 is a chart illustrating the operation of the pressure control sequence for a fume hood exhaust application.

The pressure control sequence used in the present invention is shown in FIG. 12. As indicated in FIG. 12, from a steady state condition, the fume hood exhaust jumps to a maximum value as the hood sash is opened. As a result, the laboratory room pressure decreases, which makes the differential pressure go higher. The control loop 12 then senses the deviation between the actual differential pressure and the set point and opens the supply flow to return the set point.

Figure 16:
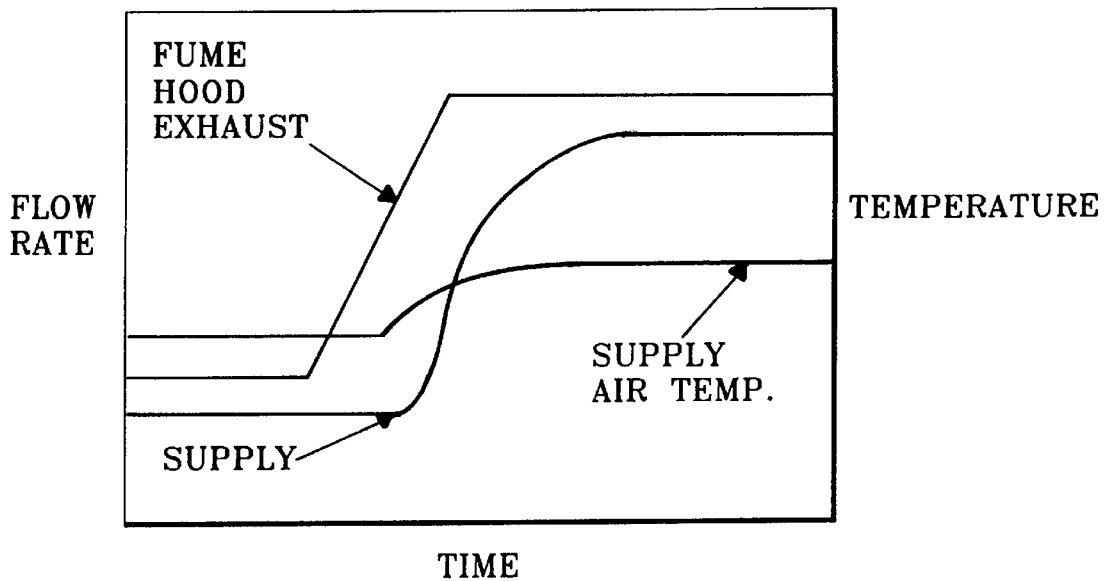
FIG. 16 is a chart illustrating the operation of the temperature control heating sequence for a fume hood exhaust application, and particularly shows the rate of heat generation and flow rates versus time.
Figure 17:
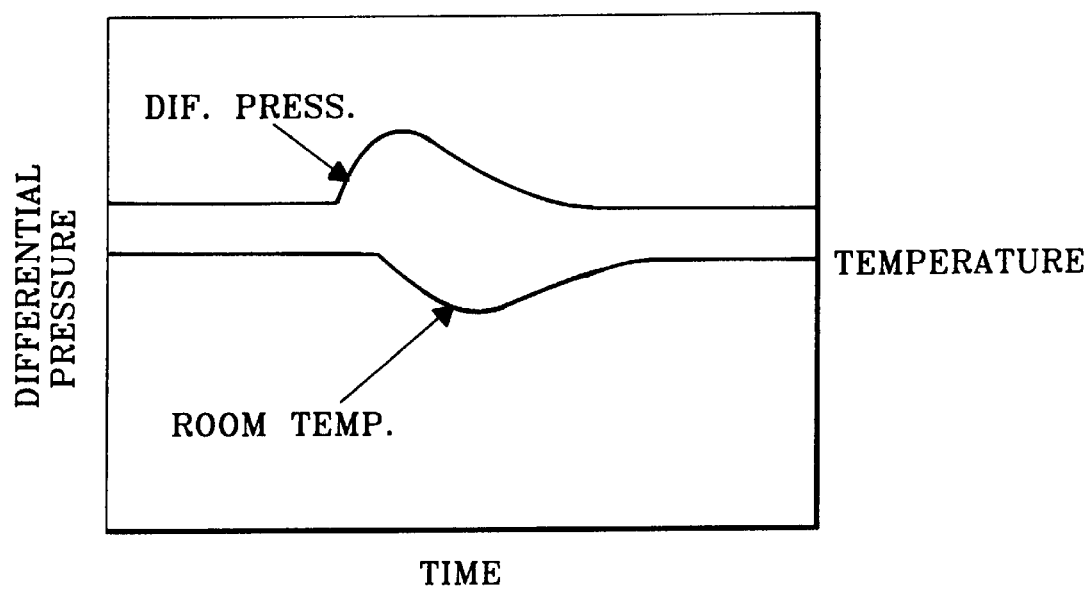
FIG. 17 is another chart illustrating the operation of the temperature control heating sequence for a fume hood exhaust application, and particularly shows the rate of rate of heat generation and flow rates versus time.

With regard to the temperature control-heating loop 10, its control sequence is shown in FIGS. 16 and 17. In most variable air volume (VAV) applications, the supply air that is fed into a laboratory space has a constant temperature of about 55° F. Based on the normal design cooling load, the supply volumetric flow rate is selected to maintain the specified room temperature, usually a value between about 70 and 75° F. To maintain the differential pressure it is necessary that the minimum total laboratory exhaust exceed the supply flow rate due to the fume hood sash opening, the supply flow rate also increases accordingly. The new supply flow rate at a constant 55 degree F. may exceed the requirement of the cooling demand. The room temperature therefore, may drop below the set point. This sequence requires the local reheat valve to open and increase the supply air temperature to keep the room temperature set point. The coupling between room pressure and thermal constraints is complex.

Figure 14:
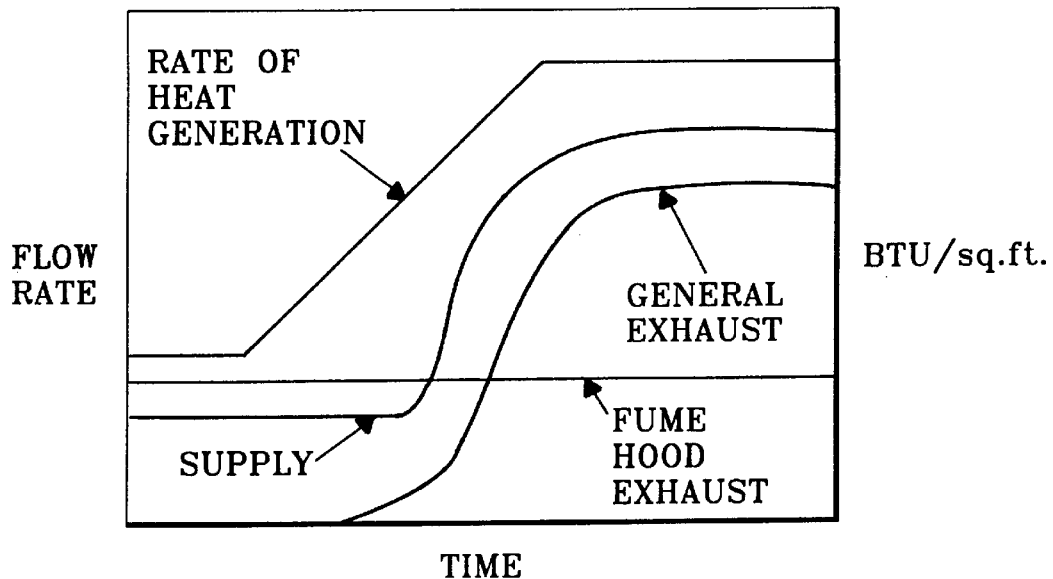
FIG. 14 is a chart illustrating the operation of the temperature control cooling sequence for a fume hood exhaust application, and particularly shows the rate of heat generation and flow rates versus time.
Figure 15:
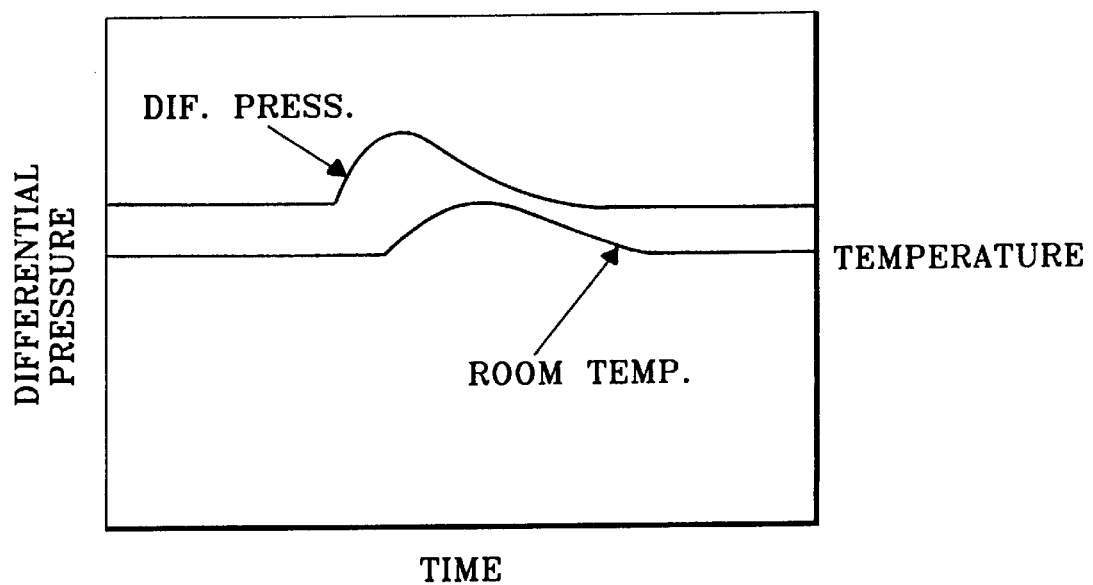
FIG. 15 is another chart illustrating the operation of the temperature control cooling sequence for a fume hood exhaust application, and particularly shows the rate of rate of heat generation and flow rates versus time.

With regard to the temperature control-cooling loop 14, its control sequence represents temperature control as a result of cooling needs. The rate of internal heat generation is the primary disturbing force that activates this sequence. The internal rate of heat generation can increase by many fold due to other activities in a laboratory such as autoclaves, ovens and occupancy. When the internal generation suddenly increases, the room temperature rises. The only cooling source available is the supply air stream at 55° F. However, the supply flow cannot be increased unless the exhaust flow is also increased in order to maintain the differential pressure constraint. But the laboratory exhaust flow cannot be increased because that will upset the laboratory room pressure. To circumvent this problem, another source of the exhaust, i.e., the general exhaust, is opened to allow an increased supply flow. As is shown in FIGS. 14 and 15, by artificially increasing the total laboratory exhaust, both room temperature and the pressure set points are maintained.

Figure 2:
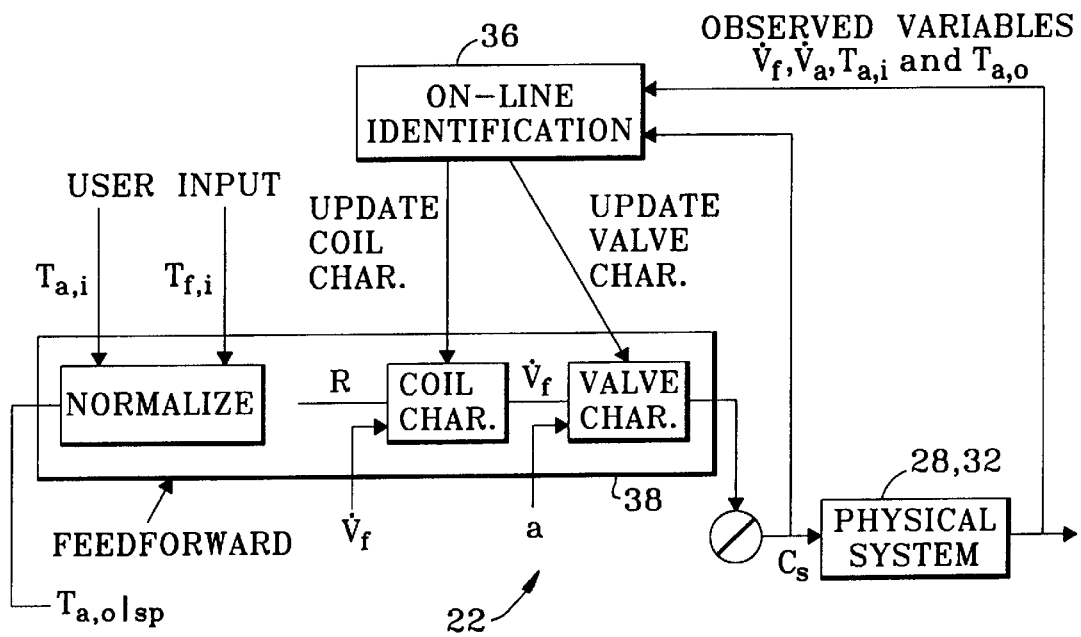
FIG. 2 generally depicts, in block diagram form, one embodiment of the feedforward control strategy identified in FIG. 1 that is employed for controlling a water heating coil and water flow control valve.
Figure 3:
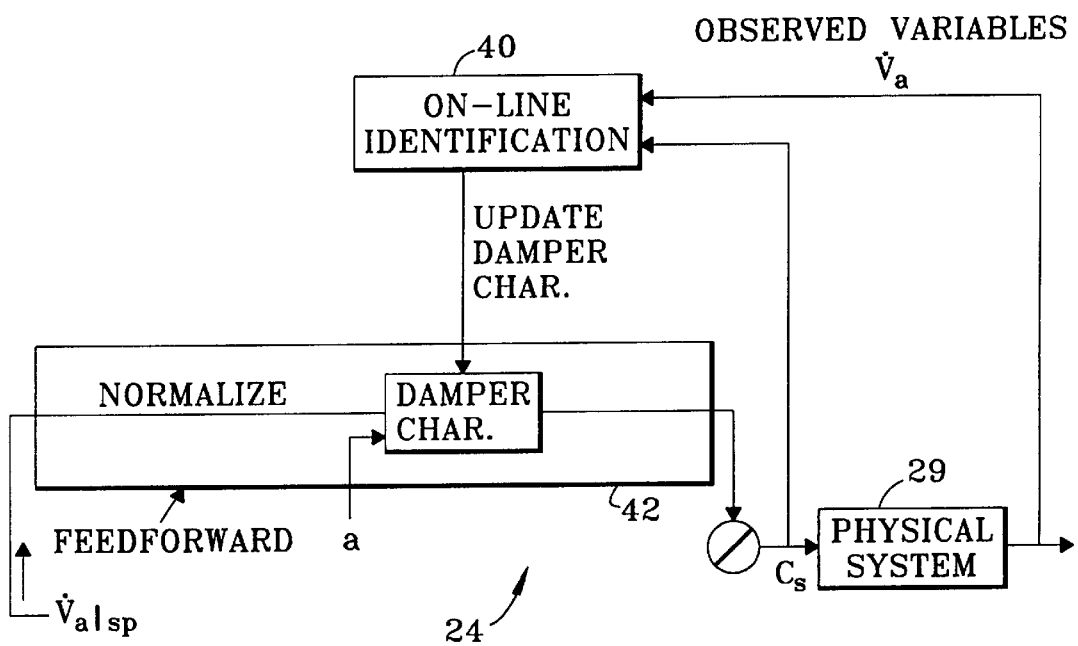
FIG. 3 generally depicts, in block diagram form, another embodiment of the feedforward control strategy identified in FIG. 1 that is employed for controlling an air damper/actuator.
Figure 4:
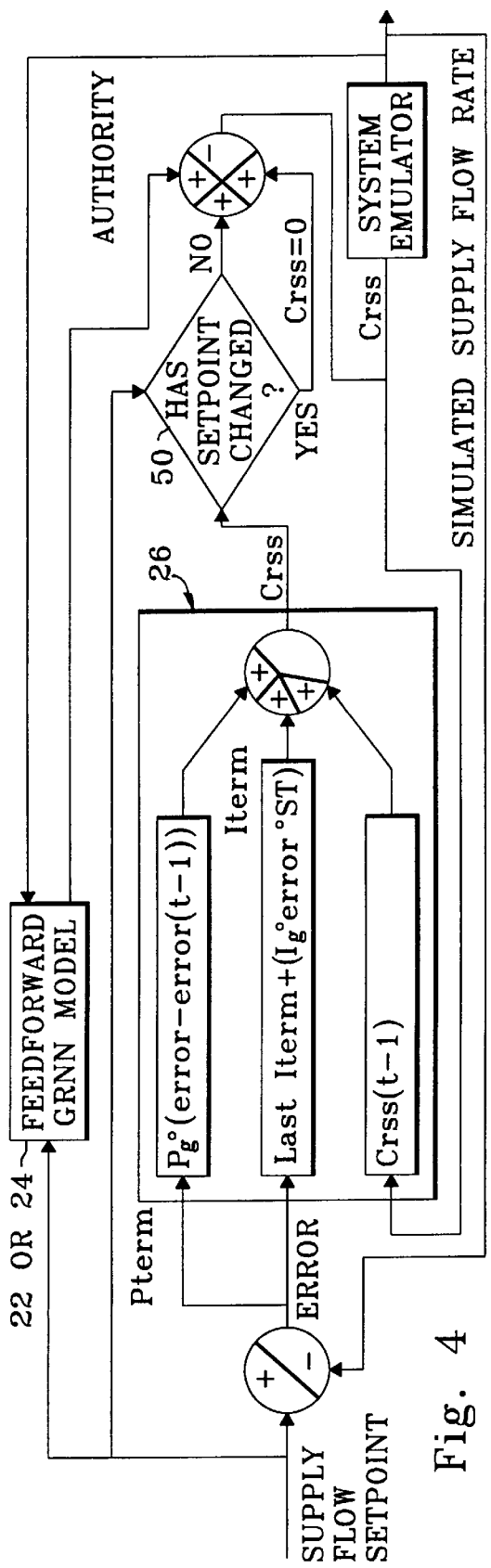
FIG. 4 generally depicts, in block diagram form, one embodiment of the feedback control strategy identified in FIG. 1.

Each of the control loops 10, 12 and 14 has feedforward blocks 22 and/or 24 which are shown in the block diagrams of FIGS. 2 and 3, respectively. The block diagram of FIG. 2 is for the feedforward control of a heating coil, while the block diagram of FIG. 3 is for the feedforward control of a damper which may be used in the temperature control-heating loop, temperature control-cooling loop and for a pressure control loop. Similarly, feedback blocks 26 are identified in the control loops 10, 12 and 14 and the block diagram for each of these feedback blocks is shown in FIG. 5 or FIG. 4.

It should be understood that the block diagram of FIG. 2 includes a physical system block 28 which is intended to diagrammatically show coil and valve actuator 32, and temperature sensors, that are used in the operation of the controller, and which are described hereinafter in detail. Also, the block diagram of FIG. 3 has a physical system block 29 which is intended to diagrammatically show the pressure measuring means and flow measuring means that are used in the operation of the controller. Similarly, control loops 10, 12 and 14 have a supply damper/actuator block 30 which is intended to diagrammatically illustrate the supply damper and actuator associated with the air supply duct to the room that is being controlled. Also, control loop 10 has a coil/valve actuator block 32 that is intended to diagrammatically illustrate the circulating water heating coil and water valve for controlling the flow of water through the heating coil, it being understood that the coil is located in the air supply duct so that the coil is adapted to heat the air passing through the supply duct. Finally, control loop 14 has a general exhaust damper/actuator block 34 that is intended to diagrammatically illustrate the general exhaust damper and actuator associated with the air general exhaust duct of the room that is being controlled. It should be understood that the general exhaust duct is separate and distinct from the exhaust duct or ducts which are connected to laboratory fume hoods that are present in the room, and which exhaust air together with fumes and the like from the interior of the fume hoods. Such fume hood exhaust will necessarily remove air from the room, and the controller will compensate for such exhausting as will be described.

Figure 5:
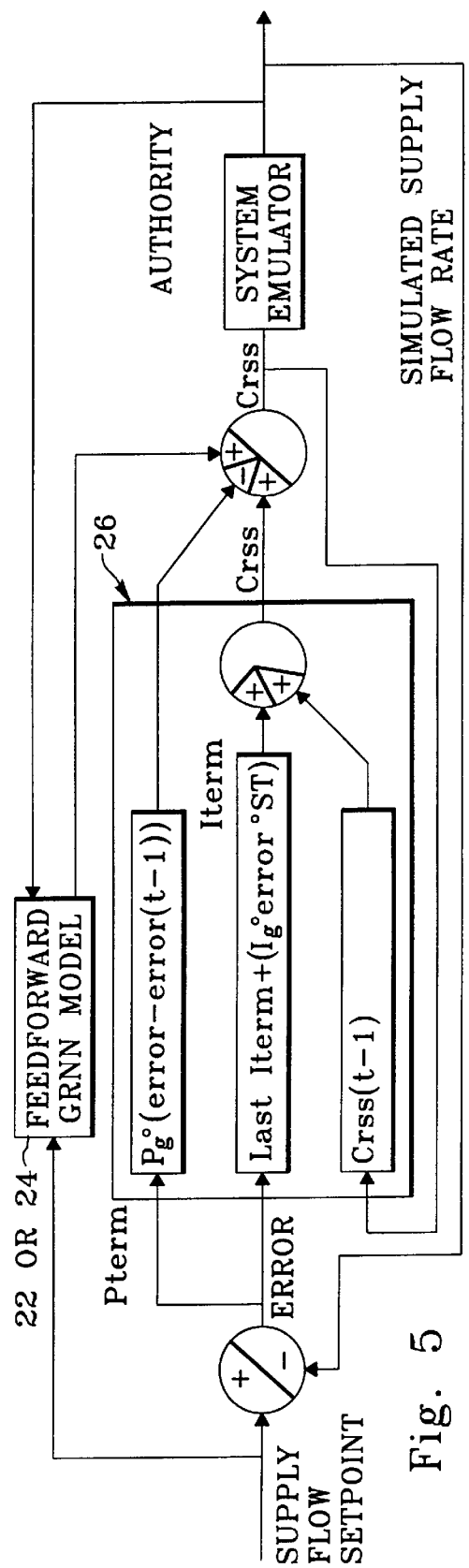
FIG. 5 generally depicts, in block diagram form, another embodiment of the feedback control strategy identified in FIG. 1.

With respect to the operation of the feedback control block 26, and referring to FIG. 5, it employs a Proportional-Integral-Derivative (PID) control method, as is known to those skilled in the art in the HVAC industry. The feedback controller uses the error between the set point and the measured variable as its input and the PID control is used to return the process variable to the set point. A simple digital version for the control signal $C_{s,m}$ from a PID can be developed starting with a discrete expression for PID at $m^{th}$ sample time as follows:

$$C_{s,m} = \overline{C} + P_g e_m + I_g S_t \sum_{i=0}^{m} e_i + \frac{D_g}{S_t}(e_m - e_{m-1}) \quad (5.1)$$

where $S_t$=sample time; $P_g$, $I_g$ and $D_g$ are proportional, integral and derivative gains. The first term on the right hand side of the equation represents a constant offset. The second term is proportional action factor, the third term is an integral action factor and the last term is a derivative action factor.

A similar expression can be written for $m-1^{th}$ sample as, $$C_{s,m-1} = \overline{C} + P_g e_{m-1} + I_g S_t \sum_{i=0}^{m-1} e_i + \frac{D_g}{S_t}(e_{m-1} - e_{m-2}) \quad (5.2)$$

Now, by subtracting latter equation from the former, the following equation can be obtained which is easy to implement in a digital controller.

$$C_{s,m} = C_{s,m-1} + P_g(e_m - e_{m-1}) + I_g S_t e_m + \frac{D_g}{S_t}(e_m - 2e_{m-1} + e_{m-2}) \quad (5.3)$$

With respect to the feedforward control, physical models are used to determine the set points for control variables; i.e., the supply air flow rate and supply air temperature and the general exhaust damper. The selection of a particular control variable is based on the application. An application is defined as a sequence of events initiated by a disturbance in a process variable; i.e., the laboratory room pressure and temperature which requires the controller to respond in order to change the state of a control variable. For example, if the laboratory room total exhaust suddenly increases due to the hood sash opening, the room pressure will decrease. Hence, the supply flow rate has to be increased in order to keep the room pressure at its set point. In this example either the total laboratory room exhaust flow or differential pressure across the laboratory room is a process variable, depending upon which one is measured, whereas the supply flow rate is the control variable.

The second step of a feedforward controller involves generating control signals based on the set point determined in the first step and the HVAC equipment characteristics. In a variable air volume (VAV) laboratory room HVAC system, two types of control equipment are commonly found. There would typically be a valve or a damper which restricts the flow of water or air followed by a water-to-air coil which heats up the laboratory room supply air. The characteristics for each component correlate input variables to the output as a control signal.

As shown in FIG. 2, the feedforward controller 22 has an on-line identification block 36 and a control block 38, and the controller 24 shown in FIG. 3 similarly has an on-line identification block 40 and control block 42. The identification blocks 36 and 40 capture and update the process characteristics based on the process input control signals and the measured variables. The identification blocks 36 and 40 pass the updated characteristics periodically to their respective control blocks 38 and 42 for control action.

In this context, it should be understood that in a sense, the feedforward controller has a "feedback" mechanism to compensate as the system characteristics change. However, this is different from a feedback control where the measured process variable is compared with its set point to generate the error signal and the output signal is essentially a function of this error signal. In the feedforward identification process, the process variable and even the system disturbance are measured if it is cost effective and feasible. The feedforward control blocks 38 and 42 act upon receiving a set point signal and provide a control signal based on the identified characteristics of the process. The essence of a feedforward control is to generate the control output in response to a change in the set point of a process or measured variable. Since the feedforward control does not need an error to generate the control signal, it responds faster than the feedback control.

The identification process captures the system characteristics over the entire operating range which makes the controller robust. If the identification scheme were able to capture the system characteristics perfectly, there would be no need for the feedback controller. However, perfection cannot be achieved without incurring a major cost due to errors, noise, and accuracy in the data. Thus, the feedback control is required to compensate for the steady state error or offset.

For each piece of control equipment in a VAV laboratory room HVAC system, the feedforward controller is capable of generating a control signal in response to a set point change of a process variable. The physical process associated with each component is needed in order to understand how the control signal can be generated.

The physical process of heating a room involves two components: a valve/actuator assembly and the heating coil. A VAV laboratory will commonly have a heating coil, a valve/actuator and damper actuators in order to satisfy both pressure and temperature requirements in the laboratory. The valve/actuator characteristics are similar to those of a damper/actuator used to modulate air flow rate in a HVAC air distribution system. Therefore, the process described here for the valve is equally applicable to dampers and actuators. By choosing an example of a heating process, the identification of all HVAC components in a VAV laboratory can be illustrated.

The water flow rate through the valve will depend on the valve open area and the authority, a. The authority is defined as the ratio of pressure drop across the valve to the overall circuit pressure drop when the valve is fully open, or for each valve, $$a = \left(\frac{\Delta P_{valve}}{\Delta P_{circuit}}\right)_{valve\ is\ fully\ open} \quad (5.4)$$

Expressing the valve characteristics in terms of authority, percent valve open and percent maximum flow rate is typical in the art (ASHRAE 1992).

For a single circuit system, in practice, the circuit pressure drop will be small compared to the valve which will cause the authority, a, to be close to 1.0. However, for a system with multiple circuits, the pressure loss in the main segment becomes significant compared to the branch segment as the distance between the pump and the coil increases. As a result, the value of authority varies depending upon the ratio of pressure losses as indicated in the authority equation. The authority of any circuit is time dependent because the flow in each circuit varies with the time. The valve authority can be calculated either using the basic relations between design pressure drop and flow rate or by measuring static pressures at the pump outlet and valve inlet at the design flow conditions and calculating authority at any time.

As shown in FIG. 2, a control signal $C_s$ is generated based on the heating demand and is sent to the valve/actuator 32 to open or close the valve. The heating coil has physical inputs of water and air flow rates and inlet air and water temperatures. The coil outputs are water temperature and air outlet temperature. Since the water outlet temperature is not directly linked to the control of supply air thermal energy, it is not considered in the identification process. Instead, R is used as a non-dimensional variable combining the water inlet temperature, $T_{f,i}$, and air inlet and outlet temperatures, $T_{a,i}$ and $T_{a,o}$ respectively. Both $T_{f,i}$ and $T_{a,i}$ are either known constants for a given system as user input parameters or are measured and input to the controller. The dimensionless variable R, which can also be viewed as coil effectiveness, is a measure of the heating supplied. R can be expressed as $$R=(T_{a,o}-T_{a,i})/(T_{f,i}-T_{a,i}) \quad (5.5)$$

The physical process described above relates the system process variables as a function of the control input. The process needs to be inverted when used in a feedforward controller to produce the desired control signals that set the valve at the desired position in response to the water flow rate set point.

This control scheme can be explained in connection with FIG. 2. The order of the physical heating process previously described is reversed in the feedforward block shown in FIG. 2. The feedforward block is activated upon receiving a signal of coil outlet air temperature set point, $T_{a,o|sp}$. The on-line identification normalizes and inverts the characteristics to produce the desired control signal. The coil characteristic is utilized first in the control process to yield the desired water flow rate, $v_f$, for the desired coil outlet air temperature set point, $T_{a,o|sp}$ and for given supply air flow rate, $v_s$. Knowing the water flow requirement and the authority, a, the identified valve characteristic then generates a control signal, $C_s$.

The observed variables from the system along with the control signal, $C_s$, may be periodically collected and used to update the coil and valve characteristics by a separate identification scheme that is indicated as an on-line adaptive identification in FIG. 2. The observed variables could include $T_{a,o}$, $T_{a,i}$, $v_f$ and $v_s$. However, instead of an expensive means of measuring water flow rate, the coil outlet water temperature, $T_{f,o}$ can be measured and $v_f$ can be calculated using the following energy balance.

$$v_f = K\dot{v}_s (T_{a,o}-T_{a,i})/(T_{f,i}-T_{f,o}) \quad (5.6)$$

where K is a constant that is determined empirically and expressed as a ratio of the products of the mass-capacitance of air and water or, $$K = \frac{\rho_a C_a}{\rho_f C_f} \quad (5.7)$$

where $\rho_a$=density of air; $\rho_f$=density of fluid; $c_a$=capacitance of air; and $c_f$=capacitance of fluid. The above water flow rate ($v_f$) equation is preferred as a way to calculate the water flow rate through the local heating coil considering cost and practicality as opposed to measuring flow directly. The HVAC control system usually trends the air flow rate through the coil as well as the discharge air temperature for control purposes. The values are updated every second or more. Often the values for coil air and water inlet temperatures are also available from the central air handling unit and chiller plant. Thus, by adding a water temperature sensor, the coil water flow rate can be estimated using the water flow rate ($v_f$) equation. This is a cost effective proposition since flow sensor costs more than a temperature sensor and such cost difference becomes significant considering the large number of local heating coils present in a building. Also, in a retrofit application, a strap-on temperature sensor can be installed outside the pipe to avoid costly job interruption. On the other hand, most types of flow sensor need to be inserted inside the existing pipe which interrupts the system operation.

A few additional factors favor the use of temperature sensor. First, the water flow rate equation will be only used for identification purposes. Hence, dynamic data are not needed to solve for water flow rate equation. Instead, only periodic steady state data are needed, which should not be difficult to obtain given the preferred sample rates of 1 or more per second. Secondly, the governing relationships between the water flow rate and air flow rate and air and water side differential temperature across the coil are important in estimating the coil water flow rate. The absolute accuracy of each measurement is therefore not critical. Finally, the purpose of the feedback controller in a combined feedforward and feedback approach is to compensate for inaccuracies with the identification process which include measurement error. Hence, accurate measurement for identification is not required.

FIG. 2 clearly demonstrates the need for estimating the coil outlet temperature set point $T_{a,o|sp}$ before the feedforward block can produce any control signal to the valve. In fact, the inverse of heating coil characteristics will generate a set point for water flow rate through the valve. By knowing the valve authority and water flow rate set point, the controller will then be able to generate a control signal to the valve.

The process described for a valve is similar to that for a damper and is shown in FIG. 3. In the case of a damper, the signal will be generated in response to the demand for air flow rate. The air flow rate set point is determined first, which along with the damper authority is used by the feedforward block to generate the control signal.

In accordance with an important aspect of the present system, a method is needed to determine the set points for the supply air flow rate and supply air temperature and general exhaust air flow rate. The supply air flow rate set point is coupled to the pressure loop for laboratory room safety. The supply air temperature set point is determined when the room temperature falls below the set point and heating is needed. The general exhaust is opened when the room becomes hot and the temperature exceeds the set point. In all cases, physical models are used to calculate the set points.

To determine the supply flow set point, the steady state mass balance and infiltration equations can be used to solve for the supply flow set point. The steady state mass balance, when written in terms of set points, is (mass balance)

$$\frac{P_s|_{sp} v'_s|_{sp}}{T_s|_{sp}} + \frac{P_{ad}|_{sp} v'_{ad}|_{sp}}{T_{ad}|_{sp}} - \frac{P|_{sp} v'_e|_{sp}}{T|_{sp}} = 0 \tag{5.8}$$

The infiltration relation, the amount of air entering the room from other than the supply duct, is:

$$v_{ad|sp} = K_1(\Delta P|_{sp})^n \tag{5.9}$$

The laboratory room pressure differential, $\Delta P|_{sp}$, is defined as a differential as follows:

$$\Delta P|_{sp} = P_{ref|sp} - P|_{sp} \tag{5.10}$$

There are nine variables in the above mass balance equation comprising the temperature, flow rate and pressure of three air streams: supply, infiltration and laboratory room exhaust. The room set points for temperature and pressure infiltration are known. The volumetric flow rate of infiltrating air at the set point, $v_{ad|sp}$, is also known from the $v_{ad|sp}$ and $\Delta P|_{sp}$ equations. Similarly, the supply air pressure, $P_s|_{sp}$, room pressure, $P|_{sp}$, and temperature, $T|_{sp}$, set points are given from design data. There are three unknowns: laboratory room supply air flow rate, $v_{s|sp}$; total laboratory room exhaust set point, $v_{e|sp}$; and supply air discharge temperature set point, $T_{s|sp}$. The total laboratory room exhaust is a sum of general exhaust and exhaust from fume hoods and given by:

$$v_{e|sp} v_{fh|sp} + v_{ex|sp} \tag{5.11}$$

In a VAV laboratory room, the fume hood exhaust set point is a known quantity for each position of the fume hood sash. Hence, by determining the set point for total laboratory room exhaust, the general exhaust set point will be known.

In order to solve for either supply air discharge temperature or general exhaust set point, the following steady state energy equation is used in addition to the four immediately preceding equations. The steady state energy equation is:

$$\frac{P_s|_{sp} v'_s|_{sp}}{R} c_p + \frac{P_{ad}|_{sp} v'_{ad}|_{sp}}{R} c_p - \frac{P|_{sp} v'_e|_{sp}}{R} c_p + c_f q_{load} = 0 \tag{5.12}$$

where $c_f$ is a unit conversion factor.

It should be understood that when the supply air discharge temperature set point is to be determined, then the general exhaust is usually a known quantity and vice versa. The need for determining the desired supply air discharge temperature arises when the fume hood exhaust suddenly increases as the sashes are opened. The increase in exhaust means more supply air is required to maintain the room pressure differential. However, the room will be overcooled if the quantity of supply air, typically at 55° F., exceeds the amount required to offset the cooling load in order to maintain room temperature at 70° F. To prevent room overcooling, the supply air must be heated and the heating coil valve controlled in order to achieve a desired supply air temperature set point.

The general exhaust is needed when fume hoods are closed and the rate of internal heat generation is increased due to process or equipment operation. The room, under such situations, needs more cooling. However, just additional cooling by means of an increase in volumetric flow rate of 55° F. supply air will upset the room pressure equilibrium. As a result, the general exhaust damper is opened to allow more supply air to provide added cooling. The controller has to determine and control the general exhaust flow rate and supply air flow rate in order to maintain the room pressure and temperature set points. In this case, of course, the supply air temperature at 55° F. is fixed. When heating is required the general exhaust damper is usually closed which means that $v_{e|sp}$ equals zero.

Hence, the use of the five preceding equations yield a set point solution for a combination of supply air flow rate and temperature or supply and general exhaust flow rates depending upon the control sequence. In the last equation, the steady state energy equation, the space thermal load, $q_{load}$, needs to be determined in order to obtain the set points. The transient room load is approximated as proportional to the first order derivative of room temperature with respect to time. This is the internal energy storage term assuming the mass of air in the laboratory room remains constant.

$$q_{load|tr} = \rho c_v dT/dt \tag{5.13}$$

The room temperature, T, can be measured directly by placing the temperature sensor in the room exhaust duct instead of following the usual practice of mounting a wall room thermostat. In many laboratories, the exhaust from the fume hoods and the laboratory room are ducted together and the common intersection between the two exhaust streams provides a good location for a duct temperature sensor. Due to the high ventilation requirement, the air in a laboratory room is well mixed and therefore, exhaust air temperature is a good representation of the room temperature, T. In certain situations, however, it is not feasible to install a duct temperature sensor due to the fear that the electrical voltage supplied to the sensor may react with the volatile fumes. Under those situations, the room wall thermostat sensor can be still used and the room temperature can be estimated by simplifying the following equation and using a temporary room air temperature sensor as explained below.

$$\frac{dT_{st}}{dt} = C1_{st}(T_{pw} - T_{st}) - C2_{st}(T_{st} - T) \tag{5.14}$$

This equation couples both the panel wall and the room air temperature to the thermostat temperature, $T_{st}$. The coupling between the panel wall and the thermostat temperature is necessary since the radiant wall heats and cools the panel wall on which the thermostat is mounted. In most laboratory rooms, the wall temperatures will be very close to the space temperature since both laboratory room and the laboratory room adjacent spaces are usually interior zones and are maintained at the same temperature. As a result, the above equation can be simplified as $$\frac{dT_{st}}{dt} = -C2_{st}(T_{st} - T) \quad (5.15)$$

The only thermostat calibration constant, $C2_{st}$, can be easily found during commissioning process by locating a temperature sensor in the exhaust duct temporary or at a good location within the room, changing the room temperature set point, trending both thermostat temperature, $T_{st}$, and room air temperature, T, from a temporary location and fitting trended data to the above equation to determine $C2_{st}$. Once the thermostat constant is calibrated, the temperature sensor can be removed from the temporary location. As an alternative, if feasible, the sensor to measure the room air temperature can be located in the general exhaust duct for the laboratory room air only. The sensor in the general exhaust duct cannot be used continuously in lieu of the thermostat since often the general exhaust damper may be closed completely and the sensor will not be exposed to the room air flow. On the other hand, by having a sensor in the general exhaust, the calibration process can be automated to update the value of the calibration constant, $C2_{st}$, routinely by using the trended sensor and the thermostat values in equation 5.15 when the general exhaust flow is significant.

When the room temperature is steady, the total cooling load can be determined by using the following energy equation, which relates the load to the total laboratory room exhaust flow rate, room temperature and the supply flow rate at the preceding time step, t−1. The air density is assumed to be constant and identical for supply, exhaust and infiltration air.

$$q_{load|ss} = v_{e,(t-1)}\rho c_p T_{(t-1)} - v_{s,(t-1)}\rho c_p T_s - v_{ad|sp}\rho c_p T_{ad} \quad (5.16)$$

The total laboratory room exhaust is expressed as a sum of general exhaust and fume hood exhaust flows, $$v_e = v_{s,(t-1)} + v_{ad|sp} \quad (5.17)$$

In both of the above equations, the infiltration flow rate set point, $v_{ad|sp}$, is used instead of actual infiltration flow rate, to avoid an oscillation in the room load prediction. The transients in $\Delta P$ will introduce oscillation in both infiltration flow rate, $v_{ad}$, and room temperature, T. As a result, the calculated room cooling load will oscillate.

In order to see the effects of transient $\Delta P$ and $v_{ad}$ on the calculated load, a simulation is performed by selecting a simple control strategy. The room pressure and temperature responses are obtained by increasing the room internal heat generation rate from a steady value of 82.50 Btu/min to 412.50 Btu/min. As the room temperature increases due to the higher rate of internal generation, the room calls for more cooling.

Additional cooling can be only provided by increasing the flow rate of supply air at 55° F. However, before the supply air flow rate is increased, the total laboratory room exhaust has to be increased to maintain the room pressure differential, which in turn requires the general exhaust to be increased. The use of the infiltration flow rate set point in predicting the load is found to work since the objective here is determine the required supply air flow rate, temperature or general exhaust flow rate in order to achieve room pressure differential and temperature set points. Essentially, the controller drives the supply and general exhaust dampers to maintain the room pressure differential of 0.05 w.c. and room temperature of 70° F. The controller first calculates the set points for supply and general exhaust flows at the steady state conditions before and after the increase in the rate of internal heat generation takes place.

Based on the flow set points, the controller determines the damper positions using the identified relationship between flow rate through the damper and the damper position. The purpose of using a simple simulation is to illustrate that the pressure and temperature transients cause, in turn, transient behavior in infiltration flow rate. The resultant effect is that the predicted load will follow the transient changes in infiltration flow rate and which are oscillatory. The instantaneous load under steady state condition is determined applying the foregoing $q_{load|ss}$ equation which uses the actual total laboratory room exhaust, $v_{ex}$. In contrast, the predicted steady state load, $q_{load|ss}$ using the set point follows the actual load very closely during the transient, and agrees with the simulated load which includes both steady state heat generation and the wall effect. The $q_{load|ss}$ at steady state uses $q_{load|ss}$ equation which calculates $v_{ex}$ assuming a set point for $\Delta P$. As a result, the set point for $q_{load|ss}$ corresponding to a $\Delta P$ set point of 0.05" w.c. is used in equation 5.16. For the selected control sequence, the difference in actual and as determined by equation 5.16 is found to be about 41 cfm which translates into a difference of about 43 Btu/min between the instantaneous load and $q_{load|ss}$ under the steady state.

Based on the observations, the predicted steady state load is selected for use in simulation instead of the instantaneous load. The controller also does not need to follow the actual instantaneous room load as that will cause the dampers to oscillate. The use of the predicted load based on set points will provide a stable control state.

When the room needs cooling, both the storage and steady state load terms are added to compute the load, $q_{load|ss}$, in order to determine the general exhaust and supply flow rate set points. In the case of heating only, however, the storage term is neglected to compute in calculating the supply air temperature set point.

The identification process produces component outputs based on input, output and information related to other variables using the identified component characteristics. There are two types of components which need to be identified: a heating coil and a valve/damper. However, since the physical characteristics will be inverted in the control process as previously explained, the identification process should capture the relationship between the inputs and outputs of the inverted physical processes. For example, for a heating coil, the inputs are a nondimensional variable, R and fixed variables $T_{a,i}$, coil inlet air temperature and fluid inlet temperature, $T_{f,i}$. The coil output will be the water flow rate through the coil, $v_f$.

Similarly, referring to FIG. 2, the identification of an inverted physical process for a damper or valve involves flow rate and authority as two inputs and control signal as an output. A damper or a valve is essentially a variable fluid resistance device. Both exhibit similar fluid characteristics and their performance is expressed in terms of identical variables and, hence, can be represented by the same models.

The General Regression Neural Network (GRNN) is chosen to identify the coil and valve characteristics due to its simplicity, robustness and excellent capability in system identification. Unlike a conventional neural network, it requires minimal computational time to effectively capture the system characteristics. The following is only a brief account of GRNN to illustrate its implementation in identification of the components.

The input to a GRNN is a series of data that can be in multiple dimensions. For sample values of $X_i$ and $Y_i$ of input vector X and the scalar output Y, an estimate for the desired mean value of Y at any given value of X is found using all of the sample values in the following relations:

$$\hat{Y}(X) = \frac{\sum_{i=1}^{n} Y_i \exp\left(-\frac{D_i^2}{2\sigma^2}\right)}{\sum_{i=1}^{n} \exp\left(-\frac{D_i^2}{2\sigma^2}\right)} \quad (5.18)$$

where the scalar function $D_i^2$, representing the Euclidean distance from the given value to the known points, is given by $$D_i^2 = (X - X_i)^T (X - X_i) \quad (5.19)$$

and σ is the single smoothing parameter of the GRNN. The above equations are the essence of the GRNN method. For a small value of the smoothing parameter, σ, the estimated density assumes non-Gaussian shapes but with the chance that the estimate may vary widely between the known irregular points. When σ is large, a very smooth regression surface is achieved. The Holdout method (Specht 1990) is used to calculate the value of smoothing parameter, σ.

The implementation of GRNN to the characteristics of a heating coil or valve/damper also offers advantages over the conventional methods of identification. In a traditional regression method for identification, the operator has to input a priori knowledge of the equation type or has to search for the best fit equation exhaustively. The code requirement for a nonlinear regression is intensive and may be prohibitive for effective on-line use. In contrast, the GRNN does not require any user input for the functional form of the characteristics and uses a strikingly simple code. Moreover, the GRNN algorithm can be imbedded into a neural hardware processor, thereby eliminating software development process to a large extent since software coding during field installation is not necessary.

For a heating coil, the input vector X contains dimensionless variable R and $v_{a|sp}$ while the output, Y, is water flow rate through the coil, $v_{f|sp}$. Using valve authority, a and $v_{f|sp}$ as input, the valve GRNN then produces an output of required valve control signal, Cs. For a damper/actuator for flow control, the input and output variables are the same as that for a valve.

In accordance with another important aspect of the controller, coil and valve characteristics are generated using the models described above, and subsequently used in the GRNN to identify the characteristics. The physical variables are first normalized. Besides R (Equation 5.5) and authority, a, whose range is from 0 to 1, other normalized variables used are $$nC_s = \frac{C_s}{C_{smax}}; nv'_s = \frac{v'_s}{v'_{smax}} \text{ and } nv'_f = \frac{v'_f}{v'_{fmax}} \quad (5.20)$$

In this example, the values of $C_{smax}$, $v_{fmax}$ and $v_{smax}$ are 1.0, 2500 cf (1180 L/s) and 1.0 gpm (0.0631 L/s), respectively. Using the value of R required to meet the load and a given value of $nv_s$, a value of $nv_f$ can be determined which can be subsequently used in a valve model along with the given authority to generate a control signal, $nc_s$, as indicated in FIG. 2. The coil and valve characteristics data in Table 5.1 are generated using normalized variables and the models described above.

The GRNN method can be best explained by using an example of regressing valve data for a constant authority.

Figure 6:
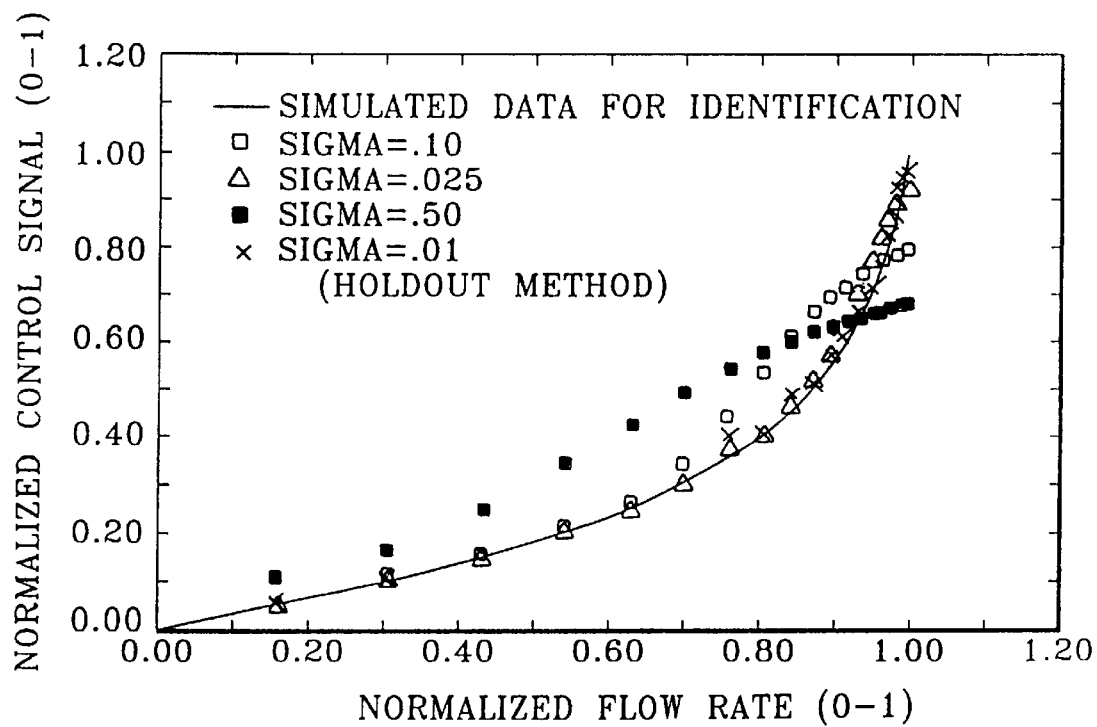
FIG. 6 is a chart of normalized flow rates versus normalized control signals for a simulated valve having an authority a of 0.1 based on representative smoothing factors σ for identification using the GRNN method.
Figure 7:
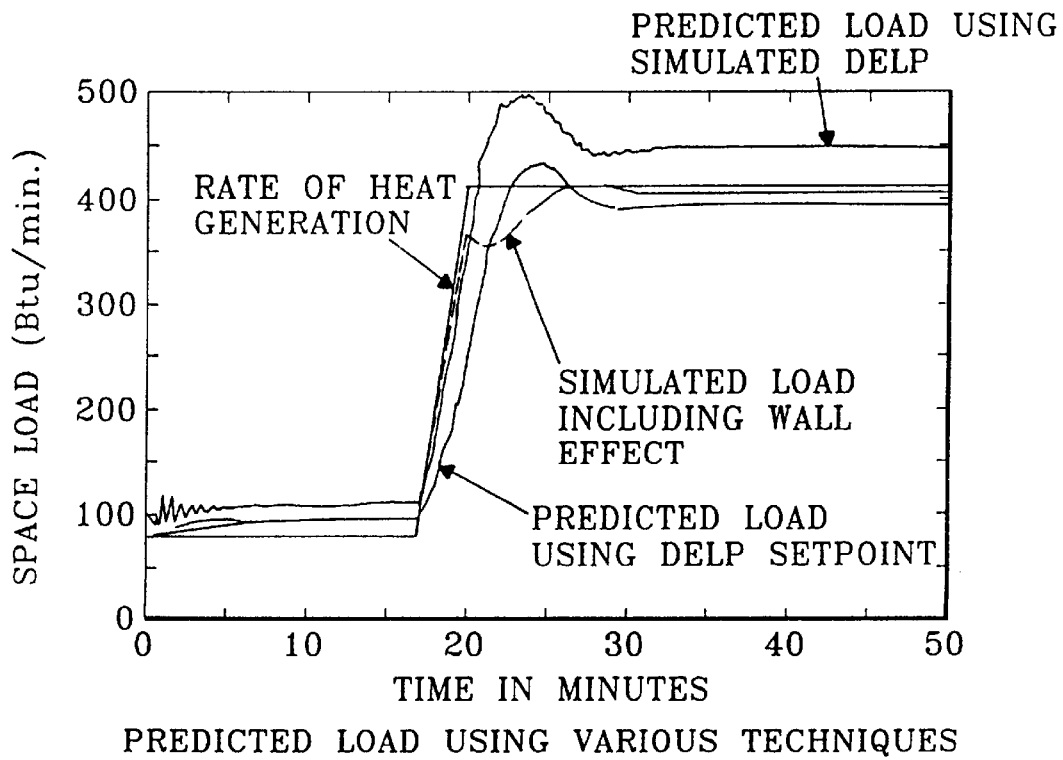
FIG. 7 is a chart illustrating predicted heat load for a room using various techniques.

For example, choosing authority a to be 0.1, a nonlinear relation, shown in FIG. 6 is established between the normalized control signal and normalized flow. For a constant authority, there is only one input and the vector X in the above scalar function equation becomes a scalar series of normalized flow rate, $nv_f$. In the scalar function equation, the function $D_i^2$ can be computed where $X_i$ is the ith sample in the series. The GRNN equation for Y(X) can then be solved using $D_i^2$, and corresponding $Y_i$ as the ith sample of $nc_s$ in the identification data.

TABLE 1

Valve Simulation Parameters
λ = .00001; $W_f$ = 1; $K_{cd}$ = .08641 (64.89; $k_0$ = .042 (31.54);

| Authority | $K_{ab}$ $\frac{\text{Inches of H}_2\text{O}}{(\text{gpm})^2}$ $\left(\frac{\text{kPa}}{(L/s)^2}\right)$ | Maximum $v'_f$ gpm (L/s) |
|---|---|---|
| 1.00 | -.086 (-64.58) | 3.00 (0.1893) |
| .70 | -.034 (-25.53) | 2.50 (0.1577) |
| .50 | .037 (27.78) | 2.12 (0.1337) |
| .20 | .407 (305.63) | 1.34 (0.0845) |
| .10 | 1.02 (765.97) | 0.95 (0.0599) |
| .05 | 2.25 (1689.64) | 0.67 (.0423) |
| .01 | 12.13 (9109.02) | 0.30 (.0189) |

The simulation of coil and valve characteristics as well as GRNN is performed using the Engineering Equation Solver (Klein and Alvarado 1997) which is specifically incorporated by reference herein. The simulated data in FIG. 6 are shown by the solid line while the points are generated by using the GRNN equation for various smoothing parameter (σ) values. Although smaller values of σ seem to represent the data better, overfitting by choosing a very small σ should be avoided. The simulated data contain fourteen samples obtained by varying nCs from 0.0 to 1.0 in increments 0.1 and nCs of 0.05, 0.15, 0.25.

The Holdout method, (Specht 1990) which is specifically incorporated by reference herein is used to calculate the optimum value for sigma, σ, and it is found to be 0.01. The effect of choosing a higher value of σ is apparent in FIG. 6. With the larger value of σ of 0.5, a smooth nearly linear trend is found that differs significantly from the input while with smaller values, the GRNN attempts to approximate all samples and is not smooth between points. For σ=0.01, the average error between the predicted and simulated signals is found to be 2.62% while the maximum error of 14% is observed for the lowest value of control signal that is not included in the identification data ($nC_s$ of 0.35). A slight error is also observed at the higher value of $nv_f$, since the control signals becomes highly sensitive to the normalized flow rate.

However, the relative error at the higher end of the valve curve is much smaller compared to the lower end due to the higher absolute value of control signal at this end. The sample size and the choice of samples, therefore, are important variables along with the smoothing parameter, σ. In fact, by including the sample of $nC_s$=0.35 in the identification data, the error between the simulated and the predicted control signal for that specific sample can be decreased from 14% to less than 1% while the average error can be dropped from 2.62% to 1.31%. In order to identify damper/valve characteristics, only 200 samples at most will be required to cover the entire range of operation. This is based on the assumption that the authorities can be varied between 0.001, 0.01, 0.05 and 0.1 to 1 in increments of 0.10 while the control signal can be varied between 0.05, 0.075, 0.01, 0.15, 0.20, 0.25, 0.30, 0.35 and 0.40 to 1.0 in increments of 0.1.

Any state-of-the-art local controller will be able to process the 200 sample values with ease and speed. In reality, however, the total number of points to cover the actual operating range will be much less, i.e., preferably less than 100.

A range of valve authorities between 0.5 and 0.1 was chosen to test the GRNN method. Again, the Holdout method is used to determine the optimum smoothing parameter σ which is now 0.05, and which produces a sum of square error of 0.189 over a identification data size of 30 samples. The identification data set includes values of authority of 0.10, 0.30 and 0.50 and $nc_s$ between 0.10 to 1.0 equally spaced. The test data set varies $nc_s$ from 0.05 to 0.95 in increments of 0.10 and also includes intermediate authorities of 0.20 and 0.40. The average error of about 3.0% is low compared to the range of the data set. Some errors higher than the average are found for higher values of control signal where the curve becomes very steep with the normalized flow rate,.

The operating range for the valve or damper is typical of these control applications. Hence, the method of using GRNN to represent characteristics using a small data set has demonstrated promise and implementable in a real controller on an on-line basis. In a real application, operating characteristics over the entire operating range can be developed during commissioning by varying the damper open area. Once captured, the operating characteristic will be stored in the feedforward controller and control signal will be generated based the stored data using GRNN. The time and effort required to tune the feedback loop will decrease as the error signal for the feedback loop will always have a low value. Reduction of commissioning cost and time and enhancement of system performance are the two major factors in favoring combined feedforward and feedback controller for a building HVAC distribution system.

The measured data obtained during the commissioning process will be used only to initialize the identification process. As the system operates and more operating data are collected, the identification will be updated accordingly. The essence of combined feedforward and feedback is to generate a rough estimate of the control signal with the feedforward block while the refinement is made with the feedback. In fact, the feedforward block also has a feedback mechanism that updates the identification. However, the identification process is kept separate from the control process for ease of implementation and cost effectiveness.

Another method for implementing GRNN in a controller is to generate the characteristics using the simulated data. The characteristics can be stored and updated as the real data become available and replaces the simulated data.

Figure 8:
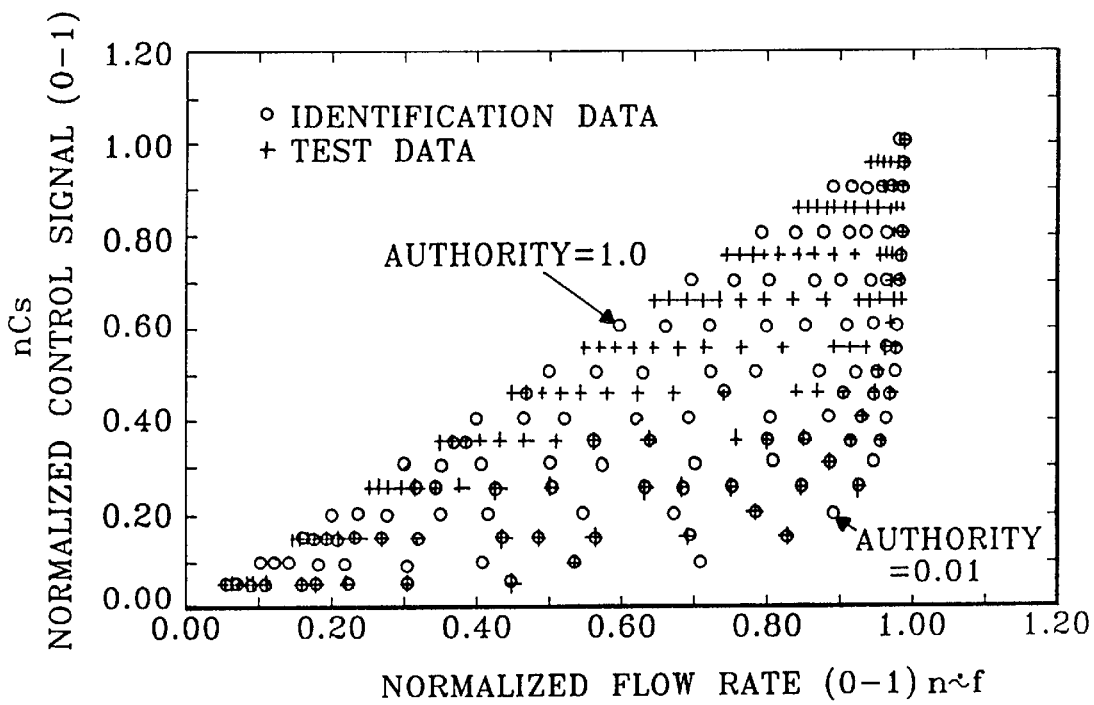
FIG. 8 is a chart of normalized flow rates versus normalized control signals for a simulated valve based upon representative valve authorities between 1 and 0.01 for identification using the GRNN method.

FIG. 8 shows both the identification and the test data covering the entire operating range of a valve. These were obtained by simulating control signals that varied between 0.1 to 1.0 for each authority in the identification set over which the authorities vary from 0.01 to 1.0. Also, additional samples are duplicated from the test set to the identification set at low values of authority and control signal. In total, 160 samples are used in the identification set while 150 samples are included in the test set. The Holdout method using a smaller data set with authorities of 0.01, 0.10, 0.25, 0.50, and 1.0 is used to optimize the value of σ. A smaller data set having sparse values still yields a good choice of σ of 0.01 for the data set shown in FIG. 8.

Figure 9:
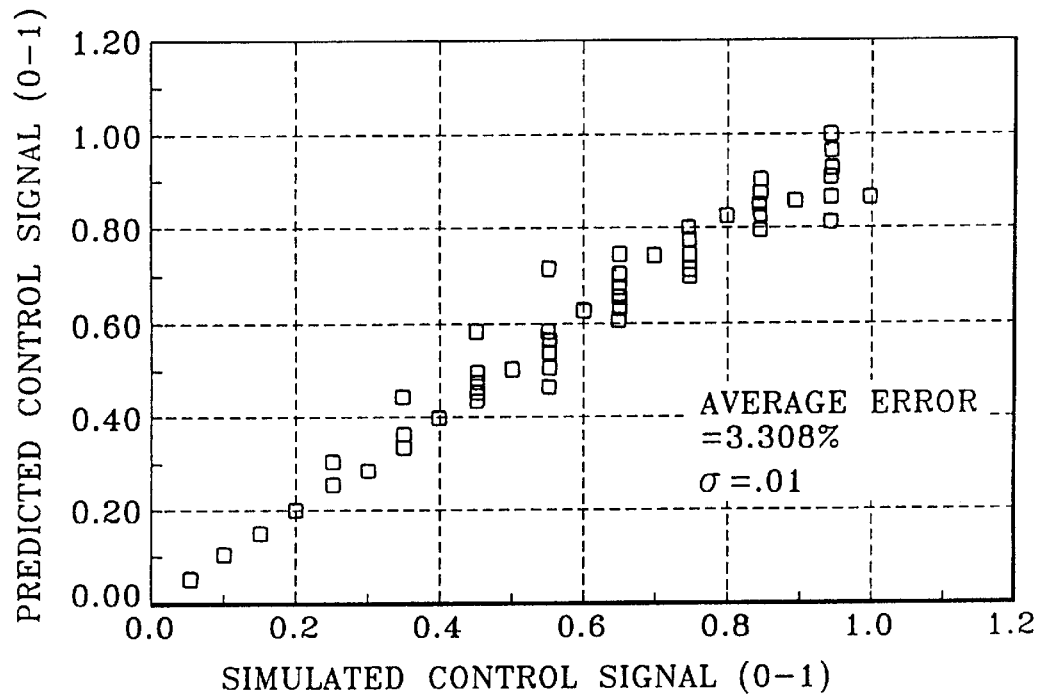
FIG. 9 is a chart comparing simulated and predicted control signals for a valve having an authority between 1 and 0.01 using the GRNN method.

The plot comparing simulated and predicted control signals is shown in FIG. 9. Again, higher than average errors occurs for large control signals as well as for low authorities. The large error for a specific sample can be vastly decreased by including that sample in the identification set. This can be easily achieved in a real controller by comparing the control signal sent to the valve and the damper and the control signal generated by the feedforward control signal. If the difference between the feedforward and the total control signal increases more than a predetermined fixed threshold value, the control signal and corresponding normalized flow rate, and the authority can be put back into the identification set.

Finally, the GRNN is used to identify the characteristics of a heating coil. Referring to FIG. 2, the GRNN needs to predict the required water flow rate through the coil for given R and air flow rate. For randomly selected values of normalized supply air flow rate $nv_s$ and R, the normalized flow rates, $nv_f$ are calculated using energy balance equation for $v_f$, the mass-capacitance equation for K, and the normalizing equations for finding nCs, $nv_s$, and $nv_f$. A portion of the simulated data is used for identification purpose while the rest is set aside to test the GRNN algorithm. The test samples are purposely chosen as to cover the entire operating range. FIG. 9 shows both the identification and the test data.

Figure 10:
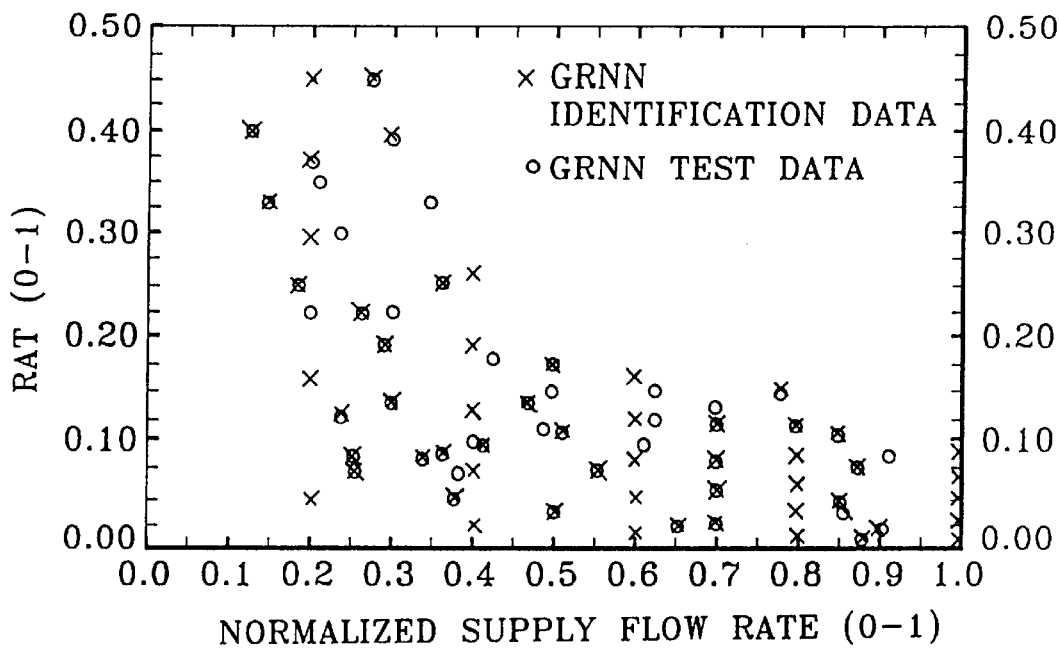
FIG. 10 is a chart of normalized supply flow rates versus coil effectiveness for a simulated coil for identification using the GRNN method.

An average error of 2.6% between the predicted and simulated normalized flow rates was found. Unlike the valve in which a definite pattern is evident, the coil plot in FIG. 10 appears random. Even with such sparse and random distribution of input data, the GRNN is able to predict the coil flow rates with good accuracy.

In addition to the simulated data, measured damper characteristics are also used to test GRNN. Two sources were used to obtain the measured values: 1) Test data taken to calibrate damper performance and 2) Active damper performance at a job site using a building automation system (BAS). In the first case, damper curves are experimentally generated for three damper authorities as shown in FIG. 11.

The test sensors used to obtain data are similar to those used in commercial building control systems. For a given control signal, the flow rate through the damper is noted and normalized using the normalizing equation. The GRNN is identified using the measured values of the control signals, flow rate and authorities while intermediate points on the authority curves are used to test the GRNN as shown in FIG. 11.

Figure 11:
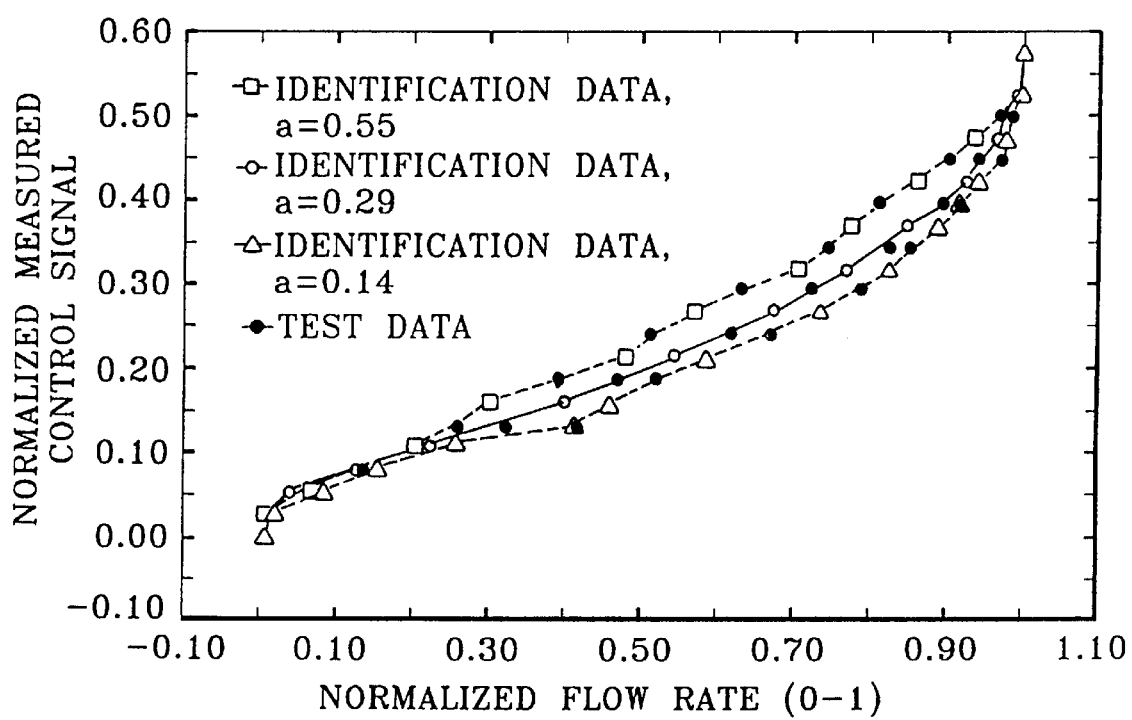
FIG. 11 is a chart of normalized flow rate versus normalized measured control signal for a damper for identification using the GRNN method.

Compared to the simulated data, the measured curves in FIG. 11 exhibit more randomness as expected. At low flow rates, the three authority curves converge into a single one indicating the difficulty of measuring flow rate when the damper is barely open. At high flow rates and low values of authority, increasing the control signal will not increase the flow. The GRNN predicted the measured values with an average accuracy of 4.30% which is good considering the error associated with the measurement and data collection system. The Holdout method is used to determine the optimum smoothing parameter, σ of 0.066. The error increases with the higher flow rate as the authority curves become highly sensitive as can be seen from FIG. 11. The range of the test data for GRNN chosen in the normal operating range of the damper between 10% to 100% of flow rate.

For the damper at the job site, the authority remained unchanged at 7% during the data collection. For the same flow rate, the damper control signal varied over a wide range at both high and low flow rates. The GRNN output is tested for each sample observation that has been used in the identification data. Pre-processing of the raw measured values is not used before the data are fed to the GRNN for identification. A pre-processing filter could be used on measured values to reduce the uncertainty with the measured values.

The accuracy of GRNN in predicting control signals has been shown to be within 6%. A linear regression of valve characteristics has also been shown to yield an average error of 7%. The essence of the GRNN method is the capability of predicting both nonlinear as well as linear characteristics without any user input for a fixed smoothing parameters. In the case of a regression tool, significant user input to specify the form the regression is required which often limits the actual on-line implementation of regression analysis for identification. Therefore, the results demonstrate that the performance of GRNN exceeds that of linear regression.

The feedforward-feedback combination topology enables the majority of the control signal to be provided from the feedforward block such that the feedback block only deals with a small steady state error and thus requires little tuning. Unlike the feedback loop, the feedforward loop acts only upon the set point value and does not require the measured values of the variables. As a result, the feedforward signal can enhance control speed in tracking the set point change. The most common method of employing feedback is the traditional approach of Proportional-Derivative-Integral (PID) algorithm, and is appropriate for the combined approach.

Local controllers can be used in the implementation of the apparatus of FIGS. 1 through 4, and they are found in large numbers in mid-size to large buildings and have sufficient memory and processing capability to remain cost effective. A control scheme can be provided that is simple, easy to implement, inexpensive, and that provides substantial enhancement in performance by coupling feedforward and feedback algorithms. This provides an improvement over the PID controller that react to a control affected by the dynamic response of the coil and valve signal. In the feedforward block previously explained, static characteristics of these devices are stored and updated.

Combining feedforward and feedback blocks is preferably done in one of two way. As a first option, shown in FIG. 4, a simple switch 50 can be used to set the control signal from the PID algorithm to zero whenever a set point change is noticed. This approach is identified as model 1. Only the feedforward block produces a control signal when the set point is changed. The PID output is only added when the set point does not change, which indicates that the system is under steady state. This combination approach is based on the fact that feedback is only responsible for the steady state error that will not be detected by the open feedforward block. It is reasonable to expect a relatively small steady state error due to the uncertainties introduced with the identification scheme, measurement and controller.

In the second approach, termed model 2 and shown in FIG. 5, the net controller output is the result of addition of the feedforward output, the integral and derivative portions of the PID output and the subtraction of the proportional part of the PID output. The logic employed here is that by subtracting the proportional output, the feedback will remain inactive to any change in the set point. The feedback will only provide the integral and the derivative actions allowing the controller to respond to the set point change by means of feedforward block.

Figure 13:
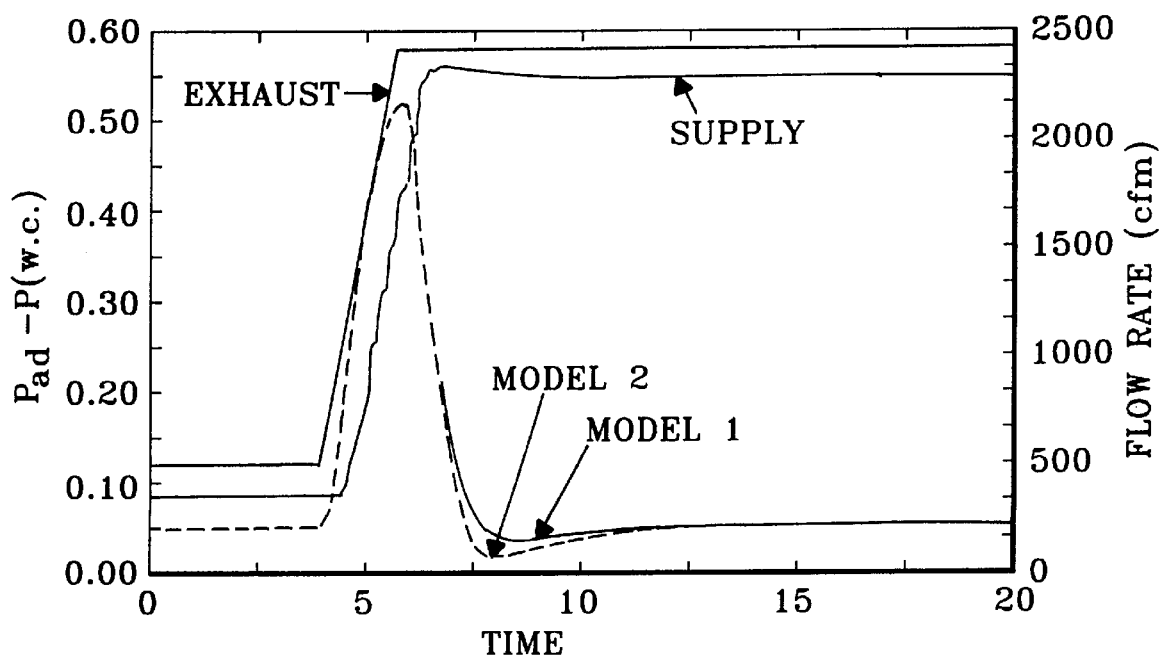
FIG. 13 is a chart illustrating the room differential pressure response comparing the performance of Models 1 and 2.

Both combination models are simulated and compared to each other using a simple sequence of pressure control to illustrate the responses. Both models performed well although model 1 performs slightly better compared to model 2 in terms of both undershoot and response time, as shown in FIG. 13. For decreasing flow, the trend is exactly opposite to that for increasing flow. The performance of the controller improves significantly with shorter sample times.

The sample time is a function of controller processing and communication speed and is often dictated by the cost. It is preferred that the controller have a sample time of 1/10 sec. or 10 samples per second.

The method of General Regression Neural Network (GRNN) effectively identifies characteristics of HVAC components for subsequent use in controls. The strength of the GRNN is apparent as it has demonstrated its ability to adapt to both linear and nonlinear relations using both simulated and measured sample observations. Unlike a traditional regression equation, however, a priori knowledge of the relationship in terms of an equation is not necessary for implementing the GRNN. The nature of the GRNN algorithm allows the method to be imbedded in a neural network architecture which makes hardware implementation possible. The smoothing parameter is the only variable that needs to be selected and it can be determined using the Holdout or other methods.

Since a small data set is needed for local HVAC control component, i.e. valves, dampers and heating coils characteristics, the GRNN provides a useful means of characterizing static performance of HVAC components for use in a feedforward block coupled with the feedback controller. Although the output Y is treated in this paper as a scalar, multiple outputs can be also handled by GRNN.

Based on the results using measured data, a conservative estimate of a 6% error in identifying coil and valve characteristics with the GRNN method is reasonable. Hence, a control signal can be generated with an average accuracy of 8.8%. The feedback controller will be adequate to generate a control signal in order to eliminate a residual error of less than 10%. Additionally, the feedback controller will require minimum tuning since the error range is anticipated to be in a fixed low range.

The combined model 1 shown in FIG. 4 which uses the PID controller under steady state only demonstrated better performance for simple room pressure control compared to Model 2 shown in FIG. 5. Model 1 showed improved performance in terms of response time, oscillation and stability when compared to the model 2.

From the foregoing, it should be appreciated that a superior controller has been shown and described which has robust control and is simple, easy to implement, inexpensive and provides substantial enhancement in performance by coupling feedforward and feedback control algorithms.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A controller for controlling the air pressure within a room in a building having at least one space adjacent to the room, the building having a heating, ventilating and air conditioning (HVAC) system with a supply duct adapted to supply air to the room and an exhaust duct adapted to exhaust air from the room, the system having a component for controlling the supply air flow into the room, the room having at least one additional exhaust independent of the HVAC system, said apparatus comprising:

a feedforward means for generating a feedforward control signal based on desired flow set points in the supply duct and general exhaust duct and based on identifying characteristics of the component, said component comprises a supply damper/actuator and an exhaust damper/actuator, the characteristics comprising the flow rate of air entering the room, the set point of the flow rate of air entering the room, the flow rate of exhaust air leaving the room, the set point of the flow rate of the exhaust air leaving the room, the authority of the supply damper/actuator, the authority of the general exhaust damper/actuator and calculated system variables;

a feedback means for generating a feedback control signal based on measured system variables; and means for combining the feedforward control signal and the feedback control signal to achieve control of the local component.

2. A controller as defined in claim 1 wherein said identifying characteristics of said damper are determined by a General Regression Neural Network (GRNN).

3. A controller as defined in claim 2 wherein said identifying characteristics are determined by the equation:

$$\hat{Y}(X) = \frac{\sum_{i=1}^{n} Y_i \exp\left(-\frac{D_i^2}{2\sigma^2}\right)}{\sum_{i=1}^{n} \exp\left(-\frac{D_i^2}{2\sigma^2}\right)}.$$

4. A controller for controlling a component comprising a supply damper/actuator and a general exhaust damper/actuator of a building heating, ventilation and air-conditioning (HVAC) fluid distribution system that affects at least the air pressure in a particular room, the room having an air supply duct and at least one general air exhaust duct, the controller being adapted to control the air flow into and out of the room to maintain a predetermined differential pressure relative to an adjacent space in the building, the controller comprising:

an identification means for periodically producing identified characteristics of the component to be controlled, said identified characteristics comprising the authority of said damper/actuators;

a feedforward means coupled to the identification means, for generating a feedforward control signal based on control set points and the identified characteristics of the component, said control set points being determined to be those which maintain the mass of the air entering the room substantially equal to the mass of the air being exhausted from the room;

a feedback means for generating a feedback control signal based on measured system variables; and means for combining the feedforward control signal and the feedback signal to achieve control of the local component.

5. A controller as defined in claim 4 wherein said control set points comprise the supply air flow rate set point and the general exhaust air flow rate set point.

6. A controller as defined in claim 5 wherein said control set points are adaptively changed as a function of changes in said identified characteristics.

7. A controller as defined in claim 6 wherein said supply air flow rate set point ($v_{s|sp}$) is determined from the equations:

$$\dot{v}'_s\big|_{sp} = \frac{T_s|_{sp}}{P_s|_{sp}} \left[ \frac{P|_{sp} \dot{v}'_e|_{sp}}{T|_{sp}} - \frac{P_{ad|sp} \dot{v}'_{ad|sp}}{T_{ad|sp}} \right]$$

where $$\dot{v}'_{ad|sp} = K_1 (\Delta P_{|sp})^n$$

$$\Delta p_{|sp} = P_{ref|sp} - P|sp$$

and $$\dot{v}'_{e|sp} = \dot{v}'_{fh|sp} + \dot{v}'_{ex|sp}$$

and where:

$P_{s|sp}$ is the supply air pressure set point;

$T_{s|sp}$ is the supply air temperature set point;

$v_{s|sp}$ is the supply air flow rate set point;

$P_{ad|sp}$ is the infiltration air pressure set point;

$T_{ad|sp}$ is the infiltration air temperature set point;

$v_{s|sp}$ is the infiltration flow rate set point;

$P_{|sp}$ is the room pressure set point;

$v_{e|sp}$ is the exhaust flow rate set point;

$T_{|sp}$ is the room temperature set point.

8. A controller as defined in claim 4 wherein said identifying characteristics of said damper are determined by a General Regression Neural Network (GRNN).

9. A controller as defined in claim 8 wherein said identifying characteristics are determined by the equation:

$$\hat{Y}(X) = \frac{\sum_{i=1}^{n} Y_i \exp\left(-\frac{D_i^2}{2\sigma^2}\right)}{\sum_{i=1}^{n} \exp\left(-\frac{D_i^2}{2\sigma^2}\right)}.$$

* * * * *

UNITED STATES PATENT AND TRADEMARK OFFICE
CERTIFICATE OF CORRECTION

| | |
|---|---|
| PATENT NO. : 6,033,302 | Page 1 of 1 |
| DATED : March 7, 2000 | |
| INVENTOR(S) : Ahmed et al. | |

It is certified that error appears in the above-identified patent and that said Letters Patent is hereby corrected as shown below:

<u>Column 20,</u>
Lines 9, 29, 32, and 34, delete "$v_{s|sp}$" and insert -- $\dot{v}_{s|sp}$ --.

Signed and Sealed this

Thirteenth Day of November, 2001

Attest:

*Attesting Officer*

NICHOLAS P. GODICI
*Acting Director of the United States Patent and Trademark Office*